(12) United States Patent
Lee et al.

(10) Patent No.: US 9,481,257 B2
(45) Date of Patent: Nov. 1, 2016

(54) BATTERY CHARGING DEVICE FOR AN ELECTRIC VEHICLE

(71) Applicant: MYONGJI UNIVERSITY INDUSTRY AND ACADEMIA COOPERATION FOUNDATION, Gyeonggi-do (KR)

(72) Inventors: Jun-Young Lee, Gyeonggi-do (KR); Gwang-Min Yoo, Seoul (KR); Seung-Hee Park, Incheon (KR)

(73) Assignee: Myongji University Industry and Academia Cooperation Foundation, Gyeonggi-Do (KR)

( * ) Notice: Subject to any disclaimer, the term of this patent is extended or adjusted under 35 U.S.C. 154(b) by 150 days.

(21) Appl. No.: 14/368,285

(22) PCT Filed: Oct. 29, 2012

(86) PCT No.: PCT/KR2012/008960
§ 371 (c)(1),
(2) Date: Jun. 23, 2014

(87) PCT Pub. No.: WO2013/094871
PCT Pub. Date: Jun. 27, 2013

(65) Prior Publication Data
US 2014/0340039 A1 Nov. 20, 2014

(30) Foreign Application Priority Data
Dec. 23, 2011 (KR) .......................... 10-2011-0140727

(51) Int. Cl.
| | |
|---|---|
| H02J 7/00 | (2006.01) |
| B60L 11/18 | (2006.01) |
| H02M 7/219 | (2006.01) |
| H02J 7/02 | (2016.01) |

(52) U.S. Cl.
CPC ......... B60L 11/1811 (2013.01); B60L 11/1812 (2013.01); H02J 7/022 (2013.01); H02M 7/219 (2013.01); B60L 11/182 (2013.01); B60L 2210/00 (2013.01); B60L 2230/10 (2013.01); B60L 2270/147 (2013.01); Y02T 10/7005 (2013.01); Y02T 10/7094 (2013.01); Y02T 10/92 (2013.01); Y02T 90/12 (2013.01); Y02T 90/122 (2013.01); Y02T 90/127 (2013.01); Y02T 90/14 (2013.01)

(58) Field of Classification Search
CPC . B60L 11/1811; B60L 11/1812; H02J 7/022; H02M 7/218
USPC ........................................................ 320/109
See application file for complete search history.

(56) References Cited

U.S. PATENT DOCUMENTS

| | | | |
|---|---|---|---|
| 2010/0172157 A1* | 7/2010 | Chen ................. | H02M 3/33592 363/21.02 |
| 2013/0201726 A1* | 8/2013 | Hu ......................... | H02M 3/28 363/17 |

FOREIGN PATENT DOCUMENTS

| | | |
|---|---|---|
| JP | 7-135769 | 5/1995 |
| JP | 7-222450 | 8/1995 |
| KR | 10-2010-0006544 | 1/2010 |

*Primary Examiner* — Vuthe Siek
(74) *Attorney, Agent, or Firm* — TechLaw LLP

(57) ABSTRACT

An electric vehicle battery charging device includes: a series resonance part, which receives a rectified voltage, and which includes a transformer, a resonant inductor, and a resonant capacitor; a rectifying part, of which a first input end is connected with one end of a secondary winding of the transformer, a second input end is connected with the other end of the secondary winding of the transformer, and an output end is connected with an electric vehicle battery; and a switching part, of which one end is connected with one end of the secondary winding of the transformer and the first input end of the rectifying part, and the other end is connected with the other end of the secondary winding of the transformer and the second input end of the rectifying part, where the switching part controls the current from the secondary winding of the transformer to the rectifying part.

17 Claims, 19 Drawing Sheets

BATTERY CHARGING DEVICE FOR AN ELECTRIC VEHICLE

CROSS-REFERENCE TO RELATED APPLICATIONS

This application is a National Phase application of PCT International Application No. PCT/KR2012/008960, which was filed on Oct. 29, 2012, and which claims priority from Korean Patent Application No. 10-2011-0140727 filed with the Korean Intellectual Property Office on Dec. 23, 2011. The disclosures of the above patent applications are incorporated herein by reference in their entirety.

BACKGROUND

1. Technical Field

Embodiments of the present invention relate to a battery charging device for an electric vehicle, more particularly to a charging device that ensures a long lifespan and is suitable for charging an electric vehicle battery having a high power density.

2. Description of the Related Art

A device for charging the battery of an electric vehicle (EV) generally uses commercial power. Thus, the battery charging device for an electric vehicle can be used for 110 $V_{ac}$ or 220 $V_{ac}$ and may require consideration of power factor correction. In order to allow charging for batteries of various specifications, the battery charging device for an electric vehicle may be required to provide a wide range of output, such as from 100 V to 500 V.

For this purpose, an electric vehicle battery charging device 100 is generally used that has a dual composition as illustrated in FIG. 1, including an AC/DC converter 110 for power factor correction (PFC), and a high-voltage link capacitor 120 for converting the varying power of AC voltage to a more stable DC power and a DC/DC converter 130 that uses a transformer for charge control.

FIG. 2 is a diagram illustrating the form of power within the conventional battery charging device 100 for an electric vehicle shown in FIG. 1.

Referring to FIG. 2, a conventional charging device 100 for an electric vehicle may rectify an AC input and may perform current control at the power factor correction terminal such that the current at the input side follows the rectified voltage. In this case, fluctuating power occurs, and a high-voltage DC link capacitor may be used for filtering. Then, the DC/DC converter, which uses a transformer for insulation, may charge the battery via current control by using the DC voltage formed at the AC/DC terminal.

However, the conventional electric vehicle charging device 100 described above has a complicated structure, due to its dual composition. Also, the conventional electric vehicle charging device 100 may require an electrolytic capacitor having a high capacitance of several thousand uF or higher and a high power density for filtering the fluctuating power, but since the lifespan of an electrolytic capacitor decreases rapidly at high temperatures, it is not suitable for applications requiring long lifespans, such as electric vehicles.

SUMMARY

To resolve the problem in the related art described above, an aspect of the invention aims to provide a battery charging device for an electric vehicle that ensures a long lifespan and is suitable for charging an electric vehicle battery having a high power density.

One embodiment of the invention provides a battery charging device for an electric vehicle that includes: a series resonance part, which is configured to receive a rectified voltage as input, and which includes a transformer, a resonant inductor, and a resonant capacitor; a rectifying part, of which a first input end is connected with one end of a secondary winding of the transformer, a second input end is connected with the other end of the secondary winding of the transformer, and an output end is connected with an electric vehicle battery; and a switching part, of which one end is connected with one end of the secondary winding of the transformer and with the first input end of the rectifying part, and the other end is connected with the other end of the secondary winding of the transformer and with the second input end of the rectifying part, where the switching part is configured to switch to an on state or an off state for controlling a flow of an electric current from the secondary winding of the transformer to the rectifying part.

Also, another embodiment of the invention provides a battery charging device for an electric vehicle that includes: a series resonance part, which is configured to receive a rectified voltage as input, and which includes a first transformer, a second transformer, a first resonant inductor, a second resonant inductor, and a resonant capacitor; a rectifying part, of which a first input end is connected with one end of a secondary winding of the first transformer and with one end of a secondary winding of the second transformer, a second input end is connected with the other end of the secondary winding of the first transformer and with the other end of the secondary winding of the second transformer, and an output end is connected with an electric vehicle battery; and a switching part, of which one end is connected with one end of the secondary winding of the first transformer, one end of the secondary winding of the second transformer, and the first input end of the rectifying part, and of which the other end is connected with the other end of the secondary winding of the first transformer, the other end of the secondary winding of the second transformer, and the second input end of the rectifying part, where the switching part is configured to switch to an on state or an off state for controlling a flow of an electric current from the secondary winding of the first transformer and the secondary winding of the first transformer to the rectifying part.

According to an embodiment of the invention, the structure of the electric vehicle battery charging device can be simplified, and the dead-zones of an input current can be removed to improve the power factor.

Also, according to an embodiment of the invention, it is possible to extend the lifespan of the electric vehicle battery charging device, to effectively charge an electric vehicle battery having a high power density.

Additional aspects and advantages of the present invention will be set forth in part in the description which follows, and in part will be obvious from the description, or may be learned by practice of the invention.

DETAILED DESCRIPTION

Figure 1:
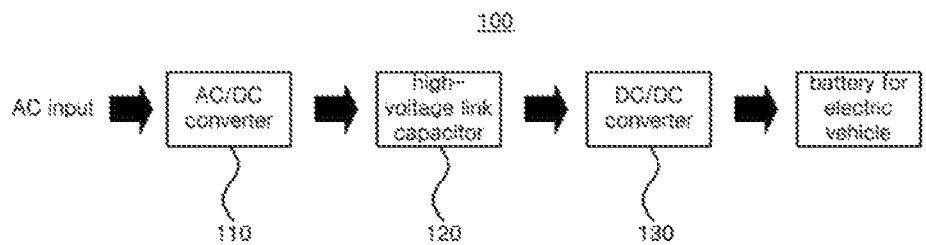
FIG. 1 illustrates the overall composition of a conventional battery charging device for an electric vehicle.
Figure 2:
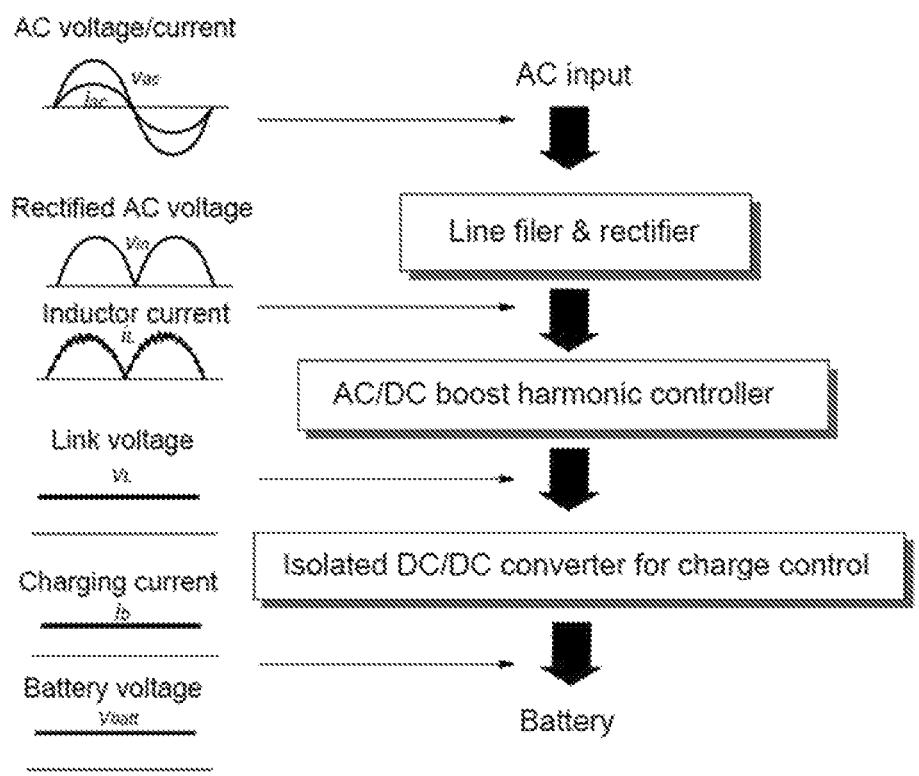
FIG. 2 illustrates the flow of electrical power in the conventional battery charging device for an electric vehicle illustrated in FIG. 1.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like components.

When a component is mentioned to be "coupled" or "connected" to another component, this may mean that it is directly coupled or connected to the other component, but it is to be understood that yet another component may exist in-between. On the other hand, when a component is mentioned to be "directly coupled" or "directly connected" to another component, it is to be understood that there are no other components in-between.

Certain embodiments of the invention will be described below in more detail with reference to the accompanying drawings.

Figure 3:
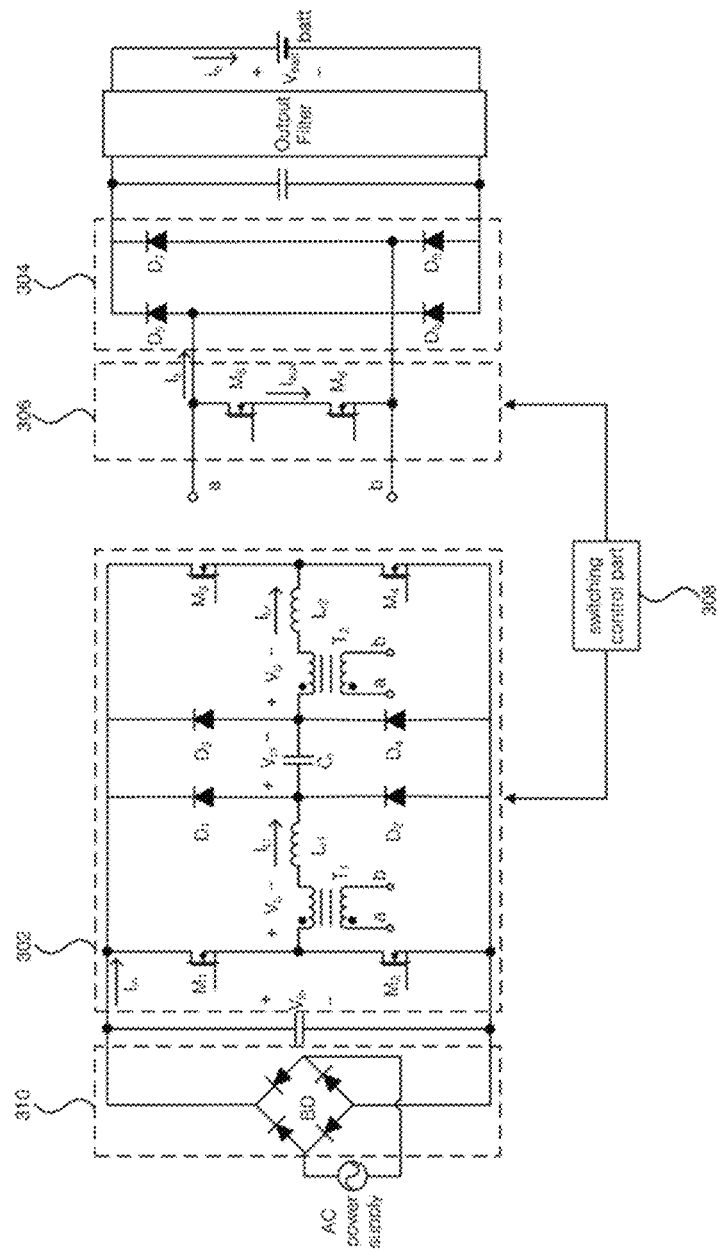
FIG. 3 illustrates the detailed composition of a battery charging device for an electric vehicle according to a first disclosed embodiment of the invention.

FIG. 3 illustrates the detailed composition of a battery charging device for an electric vehicle according to a first disclosed embodiment of the invention.

Referring to FIG. 3, an electric vehicle battery charging device 300 according to the first disclosed embodiment of the invention may include a primary circuit that includes a low-frequency rectifier 310 and a series resonance part 302, a secondary circuit that includes a rectifying part 304 and a switching part 306, and a switching control part 308. The function of each component is described below in more detail.

First, the series resonance part 302 included in the primary circuit may receive an input of a rectified voltage ($V_{in}$) from the low-frequency rectifier 310 and may include two transformers $T_1$, $T_2$, two resonant inductors $L_{r1}$, $L_{r2}$, a resonant capacitor $C_r$, four switching elements $M_1$, $M_2$, $M_3$, $M_4$, and four diodes $D_1$, $D_2$, $D_3$, $D_4$.

Taking a closer look at the connections between the components within the series resonance part 302, the other end of the first switching element $M_1$ and one end of the second switching element $M_2$ may be connected with one end of the primary winding of the first transformer $T_1$, and a rectified voltage ($V_{in}$) may be inputted to one end of the first switching element $M_1$ and the other of the second switching element $M_2$. Also, the other end of the first diode $D_1$ and one end of the second diode $D_2$ may be connected with the other end of the primary winding of the first transformer $T_1$ (to be more specific, the other end of the first diode $D_1$ and one end of the second diode $D_2$ may be connected with the other end of the primary winding of the first transformer $T_1$ by way of the first resonant inductor $L_{r1}$), one end of the first diode $D_1$ may be connected with one end of the first switching element $M_1$, and the other end of the second diode $D_2$ may be connected with the other end of the second switching element $M_2$.

Continuing with the description, the other end of the third switching element $M_3$ and one end of the fourth switching element $M_4$ may be connected with the other end of the primary winding of the second transformer $T_2$ (to be more specific, the other end of the third switching element $M_3$ and one end of the fourth switching element $M_4$ may be connected with the other end of the primary winding of the second transformer $T_2$ by way of the second resonant inductor $L_{r2}$), and the other end of the third diode $D_3$ and one end of the fourth diode $D_4$ may be connected with one end of the primary winding of the second transformer $T_2$. Also, one end of the third diode $D_3$ may be connected with one end of the third switching element $M_3$, one end of the first switching element $M_1$, and one end of the first diode $D_1$, and the other end of the fourth diode $D_4$ may be connected with the other end of the fourth switching element $M_4$, the other end of the second switching element $M_2$, and the other end of the second diode $D_2$.

Further, one end of the resonant capacitor $C_r$ may be connected with the other end of the first diode $D_1$ and one end of the second diode $D_2$ (i.e. one end of the first resonant inductor $L_{r1}$), and the other end of the resonant capacitor $C_r$ may be connected with the other end of the third diode $D_3$ and one end of the fourth diode $D_4$ (i.e. one end of the primary winding of the second transformer $T_2$). An electrolytic capacitor having a high capacitance or a film capacitor having a small capacitance can be used for the resonant capacitor $C_r$. Using a film capacitor having a small capacitance can increase the lifespan and reduce the size of the electric vehicle battery charging device 300.

Next, the rectifying part 304 included in the secondary circuit may be connected with the secondary winding of the transformers $T_1$, $T_2$ included in the series resonance part 302 and may operate as a high-frequency rectifier.

To be more specific, a first input end of the rectifying part 304 may be connected with one end of the secondary winding of the first transformer $T_1$ and with one end of the secondary winding of the second transformer $T_2$, a second input end of the rectifying part 304 may be connected with the other end of the secondary winding of the first transformer $T_1$ and with the other end of the secondary winding of the second transformer $T_2$, and the output end of the rectifying part 304 may be connected with the battery for the electric vehicle (batt). Here, the rectifying part 304 can be composed of four diodes $D_5$, $D_6$, $D_7$, $D_8$ that are connected in a full bridge configuration.

Furthermore, this switching part 306 included in the secondary circuit may be a component that performs a current-boosting function, and may be switched on or off to control the flow of electric currents from the secondary windings of the transformers $T_1$, $T_2$ to the rectifying part 304.

To be more specific, the switching part 306 may have one end connected with one end of the secondary winding of the first transformer $T_1$, one end of the secondary winding of the second transformer $T_2$, and the first input end of the rectifying part 304, and may have the other end connected with the other end of the secondary winding of the first transformer $T_1$, the other end of the secondary winding of the second transformer $T_2$, and the second input end of the rectifying part 304. When the switching part 306 is switched on, terminal a and terminal b are short-circuited, so that no current is inputted to the rectifying part 304 (i.e. $I_S=0$), and when the switching part 306 is switched off, terminal a and terminal b are made open. Accordingly, the switching part 306 can include a fifth switching element $M_5$ for controlling the flow of current in one direction and a sixth switching element $M_6$ for controlling the flow of current in the other direction, as illustrated in FIG. 3.

According to an embodiment, the first switching element $M_1$ and the fourth switching element $M_4$ can be turned on/off simultaneously, and the second switching element $M_2$ and the third switching element $M_3$ can be turned on/off simultaneously. In this case, the arrangement can be controlled such that the time during which the first switching element $M_1$ and the fourth switching element $M_4$ are turned on does not overlap the time during which the second switching element $M_2$ and the third switching element $M_3$ are turned on.

In this case, according to an embodiment of the invention, the first switching element $M_1$, the second switching element $M_2$, the third switching element $M_3$, and the fourth switching element $M_4$ can be switched on/off periodically, and the on/off period of the first switching element $M_1$, the on/off period of the second switching element $M_2$, the on/off period of the third switching element $M_3$, and the on/off period of the fourth switching element $M_4$ can be equal.

Finally, the switching control part 308 may generate control signals for controlling the switching on/off of the first to fourth switching elements $M_1$, $M_2$, $M_3$, $M_4$ and the switching part 306 (i.e. the fifth switching element $M_5$ and sixth switching element $M_6$). For example, if the first to sixth switching elements $M_1$, $M_2$, $M_3$, $M_4$, $M_5$, $M_6$ are implemented as MOSFET's as illustrated in FIG. 3, the generated control signals may be inputted to the gate electrodes of the six MOSFET's ($M_1$, $M_2$, $M_3$, $M_4$, $M_5$, $M_6$).

A more detailed description of the operation of an electric vehicle battery charging device 300 according to the first disclosed embodiment of the invention is provided below with reference to FIG. 4 through FIG. 10.

Figure 4:
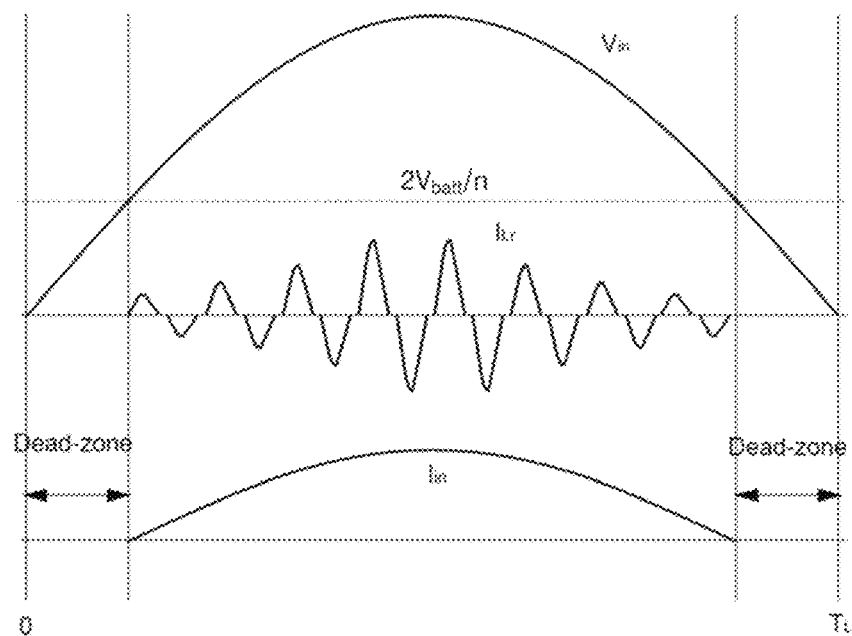
FIG. 4 illustrates an operation in a case where there is no switching part present on the secondary circuit of a battery charging device for an electric vehicle according to the first disclosed embodiment of the invention.

FIG. 4 illustrates an operation in a case where there is no switching part 306 present on the secondary circuit of an electric vehicle battery charging device 300 according to the first disclosed embodiment of the invention.

To be more specific, FIG. 4 illustrates changes in the rectified voltage ($V_{in}$), the resonance current ($I_{Lr}$) flowing through the resonant inductors $L_{r1}$, $L_{r2}$, and the input current ($I_{in}$), for a case in which there is no switching part 306 present, the first to fourth switching elements $M_1$, $M_2$, $M_3$, $M_4$ are switched on/off according to equal periods, the first switching element $M_1$ and the fourth switching element $M_4$ are turned on/off simultaneously, the second switching element $M_2$ and the third switching element $M_3$ are turned on/off simultaneously, and the time during which the first switching element $M_1$/fourth switching element $M_4$ are turned on does not overlap the time during which the second switching element $M_2$/third switching element $M_3$ are turned on.

Referring to FIG. 4, if the first to fourth switching elements $M_1$, $M_2$, $M_3$, $M_4$ are operated as described above and if the turns ratio of the two transformers $T_1$, $T_2$ is 1:n, then a voltage of $V_{batt}/n$ would be applied to the primary winding of each of the two transformers $T_1$, $T_2$, so that the primary windings of the two transformers connected in series would have a total voltage of $2V_{batt}/n$ applied thereto.

However, if the magnitude of the rectified voltage ($V_{in}$) is smaller than $2V_{batt}/n$, the first to fourth diodes $D_1$, $D_2$, $D_3$, $D_4$ would not conduct a current, and therefore dead zones may occur in which there is no input current ($I_{in}$) and no resonance current ($I_{Lr}$), as illustrated in FIG. 4. Dead zones may lower the power factor of the electric vehicle battery charging device, and if the voltage of the electric vehicle battery (batt) is lower than the rectified voltage ($V_{in}$), the electric vehicle battery would not be charged.

An electric vehicle battery charging device 300 according to the first disclosed embodiment of the invention may resolve this problem by having the switching part 306 perform current boosting. A more detailed description of the switching operation of the switching part 306 for resolving the above-described problem is provided below with reference to FIG. 5 through FIG. 10.

Figure 5:
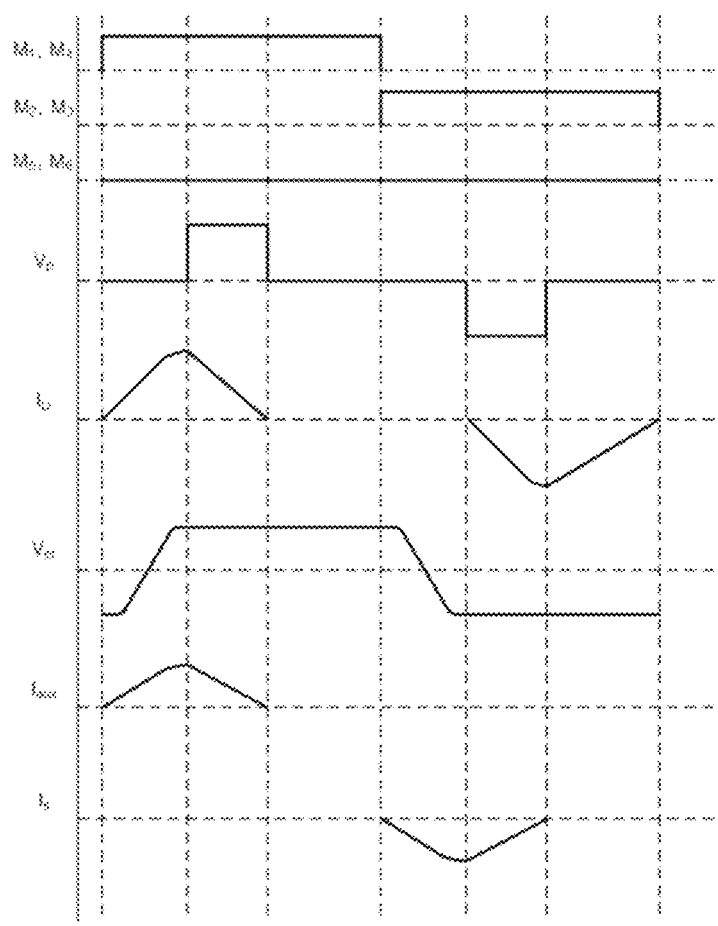
FIG. 5 illustrates the operation of a battery charging device for an electric vehicle in a case where the magnitude of the rectified voltage ($V_{in}$) is greater than or equal to the sum ($=2V_{batt}/n$) of the voltage applied to the primary winding of the first transformer $T_1$ and the voltage applied to the primary winding of the second transformer $T_2$.

FIG. 5 illustrates the operation of an electric vehicle battery charging device 300 in a case where the magnitude of the rectified voltage ($V_{in}$) is greater than or equal to the sum ($=2V_{batt}/n$) of the voltage applied to the primary winding of the first transformer $T_1$ and the voltage applied to the primary winding of the second transformer $T_2$, while FIG. 6A, FIG. 6B, FIG. 7A, and FIG. 7B illustrate the flow of an electric current in an electric vehicle battery charging device 300 that is controlled as in FIG. 5.

Referring to FIG. 5, if the magnitude of the rectified voltage ($V_{in}$) is greater than or equal to the sum of the voltage applied to the primary winding of the first transformer $T_1$ and the voltage applied to the primary winding of the first transformer $T_2$, the switching control part 308 may, from a state in which the switching part 306 is off (i.e. the fifth switching element $M_5$ and sixth switching element $M_6$ are off), switch on the first switching element $M_1$ and fourth switching element $M_4$ simultaneously and switch off the second switching element $M_2$ and third switching element $M_3$ simultaneously.

Figure 6A:
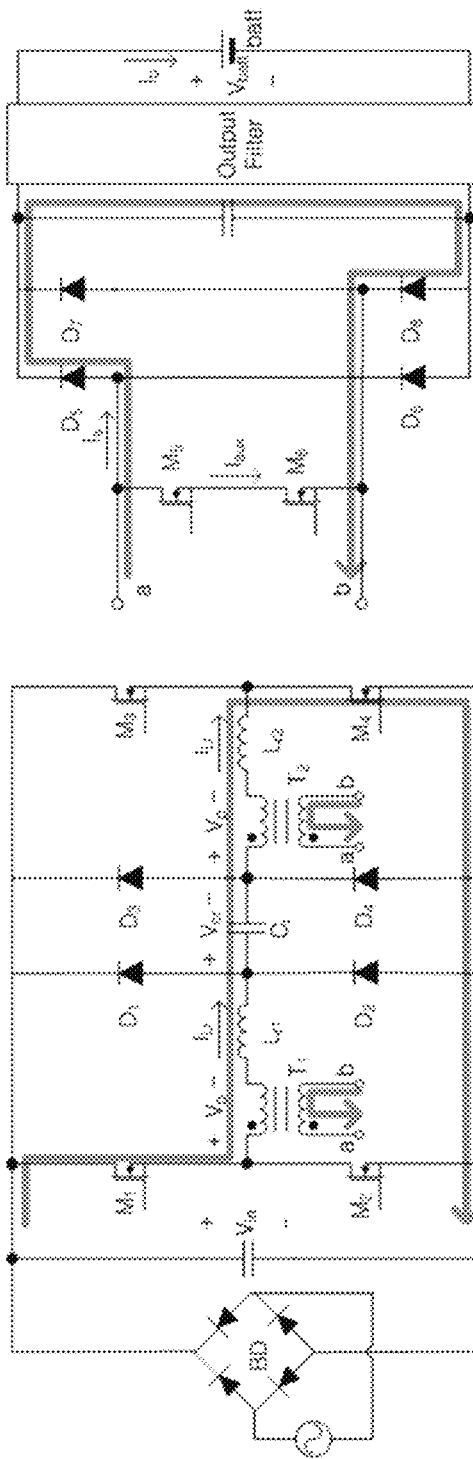
FIG. 6A, FIG. 6B, FIG. 7A, and FIG. 7B illustrate the flow of an electric current in a battery charging device for an electric vehicle that is controlled as in FIG. 5.

Here, the path of the electric current within the electric vehicle battery charging device 300 may be formed as indicated in FIG. 6A, whereby a resonance current ($I_{Lr}$) may occur in the resonant inductors $L_{r1}$, $L_{r2}$. The resonance current ($I_{Lr}$) thus generated may be transferred to the secondary circuit by way of the secondary windings of the transformers $T_1$, $T_2$ and transferred as output through the fifth diode $D_5$ and the eighth diode $D_8$. During this time, the voltage ($V_{Cr}$) of the resonant capacitor $C_r$ may increase from $-V_{in}$ to $+V_{in}$ while resonating.

Figure 6B:
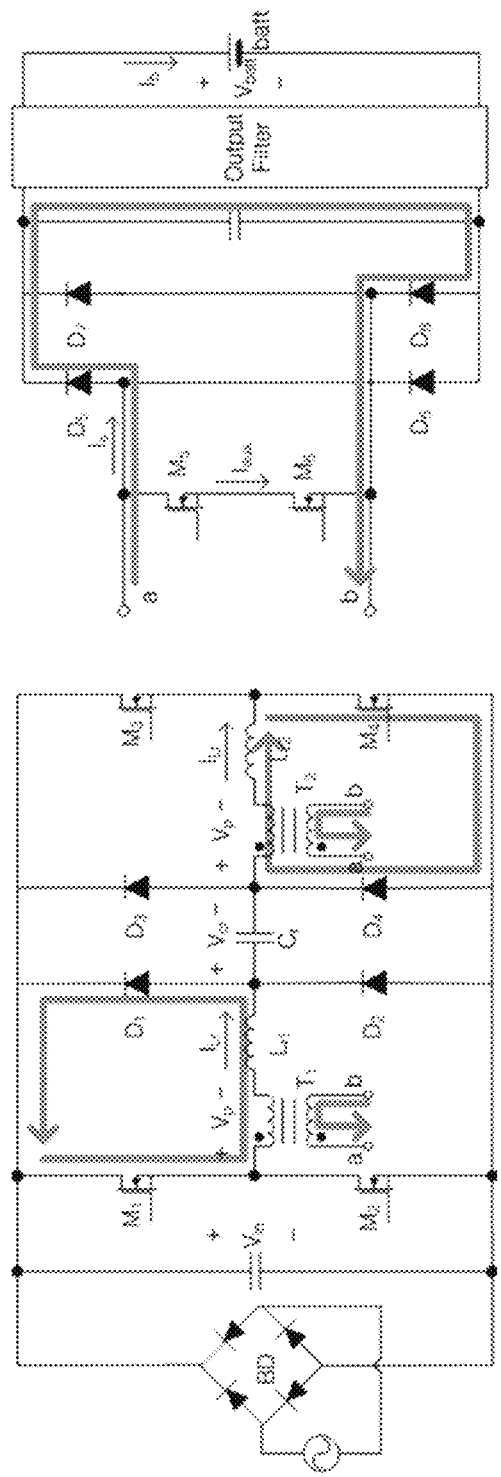

Continuing with the description, when the magnitude of the voltage ($V_{Cr}$) of the resonant capacitor $C_r$ becomes equal to the magnitude of the rectified voltage ($V_{in}$), the first diode $D_1$ and fourth diode $D_4$ of the primary circuit may conduct a current, and as a result, the path of the electric current within the electric vehicle battery charging device 300 may be formed as indicated in FIG. 6B. Here, the resonance current ($I_{Lr}$) may decrease linearly with a slope of $-V_{batt}/(nL)$ as it is transferred to the secondary circuit.

Afterwards, when the magnitude of the resonance current ($I_{Lr}$) becomes 0, there would be no electric current flowing within the electric vehicle battery charging device 300 and the operation of the overall circuit may be halted.

Next, the switching control part 308 may, from a state in which the switching part 306 is off (i.e. the fifth switching element $M_5$ and sixth switching element $M_6$ are off), switch on the second switching element $M_2$ and third switching element $M_3$ simultaneously, and at the same time, switch off the first switching element $M_1$ and fourth switching element $M_4$.

Figure 7A:
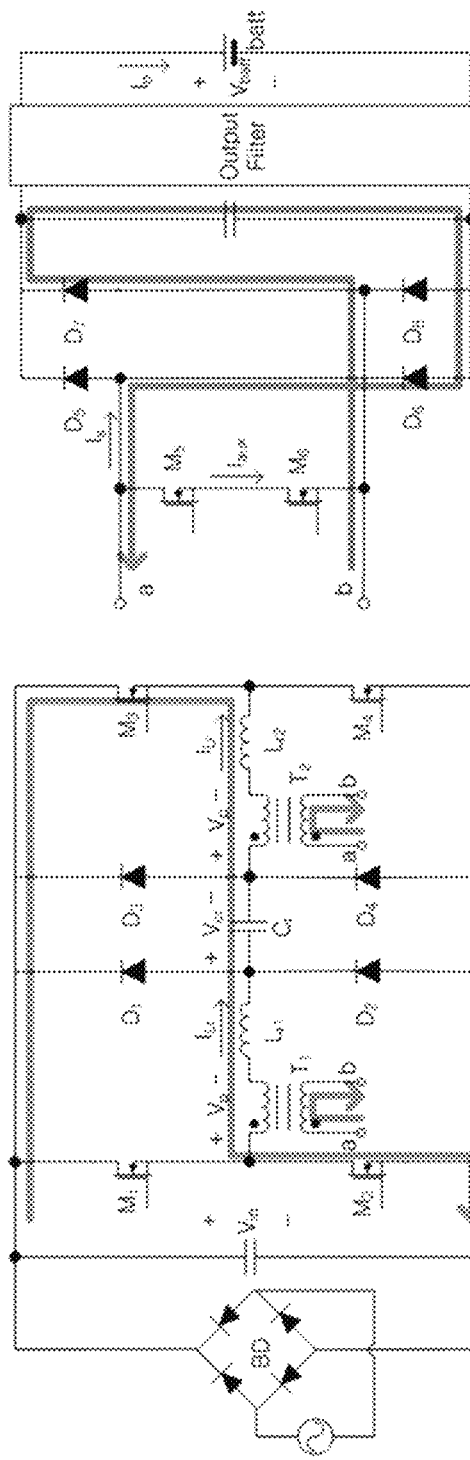

Here, the path of the electric current within the electric vehicle battery charging device 300 may be formed as indicated in FIG. 7A, whereby a resonance current ($I_{Lr}$) may occur in the resonant inductors $L_{r1}$, $L_{r2}$. The resonance current ($I_{Lr}$) thus generated may be transferred to the secondary circuit by way of the secondary windings of the transformers $T_1$, $T_2$ and transferred as output through the sixth diode $D_6$ and the seventh diode $D_7$. During this time, the voltage ($V_{Cr}$) of the resonant capacitor $C_r$ may decrease from $-V_{in}$ to $+V_{in}$ while resonating.

Figure 7B:
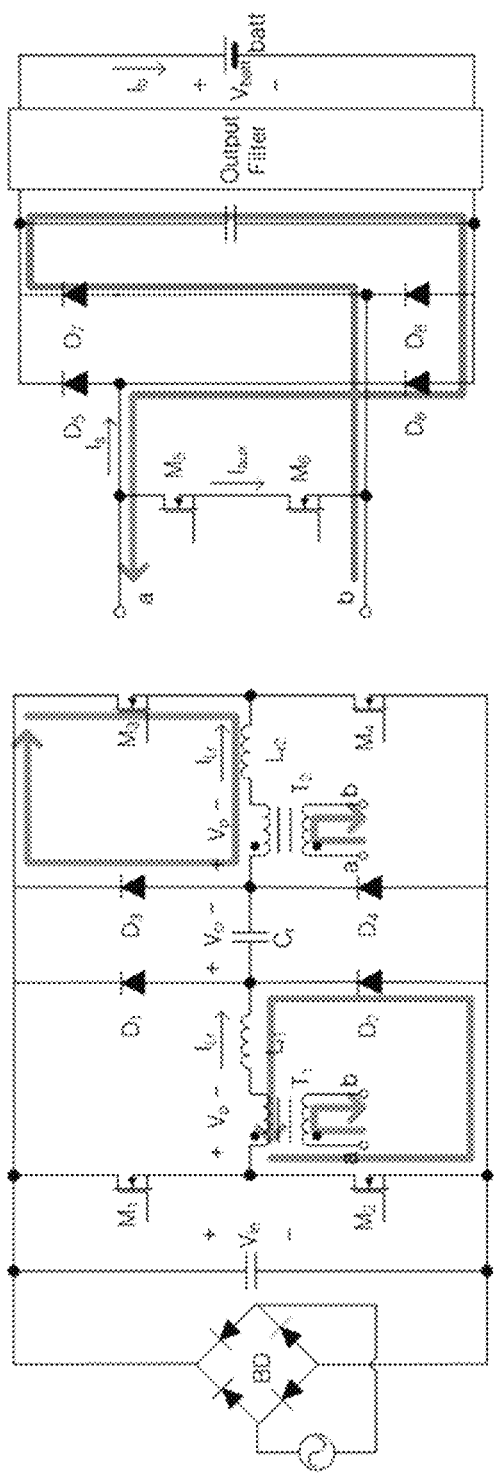

Continuing with the description, when the magnitude of the voltage ($V_{Cr}$) of the resonant capacitor $C_r$ becomes equal to the magnitude of the rectified voltage ($V_{in}$), the second diode $D_2$ and third diode $D_3$ of the primary circuit may conduct a current, and as a result, the path of the electric current within the electric vehicle battery charging device 300 may be formed as indicated in FIG. 7B. Here, the resonance current ($I_{Lr}$) may increase linearly with a slope of $V_{batt}/(nL)$ as it is transferred to the secondary circuit.

Afterwards, when the magnitude of the resonance current ($I_{Lr}$) becomes 0, there would be no electric current flowing within the electric vehicle battery charging device 300 and the operation of the overall circuit may be halted.

Briefly put, in cases where the magnitude of the rectified voltage ($V_{in}$) is greater than or equal to the sum of the voltage applied to the primary winding of the first transformer $T_1$ and the primary winding of the second transformer $T_2$, the switching control part 308 may provide control such that the first switching element $M_1$ and fourth switching element $M_4$ are turned on/off simultaneously, the second switching element $M_2$ and the third switching element $M_3$ are turned on/off simultaneously, and the time during which the first switching element $M_1$/fourth switching element $M_4$ are turned on does not overlap the time during which the second switching element $M_2$/third switching element $M_3$ are turned on, as a result of which the battery for an electric vehicle (batt) may be charged. Here, the first to fourth switching elements $M_1$, $M_2$, $M_3$, $M_4$ can be switched on or off periodically, and the period of switching on/off for the first to fourth switching elements $M_1$, $M_2$, $M_3$, $M_4$ can be the same.

Thus, the current ($I_s$) flowing through the secondary circuit may have the same form as the resonance current ($I_{Lr}$) and its magnitude may be $2I_{Lr}/n$.

Figure 8:
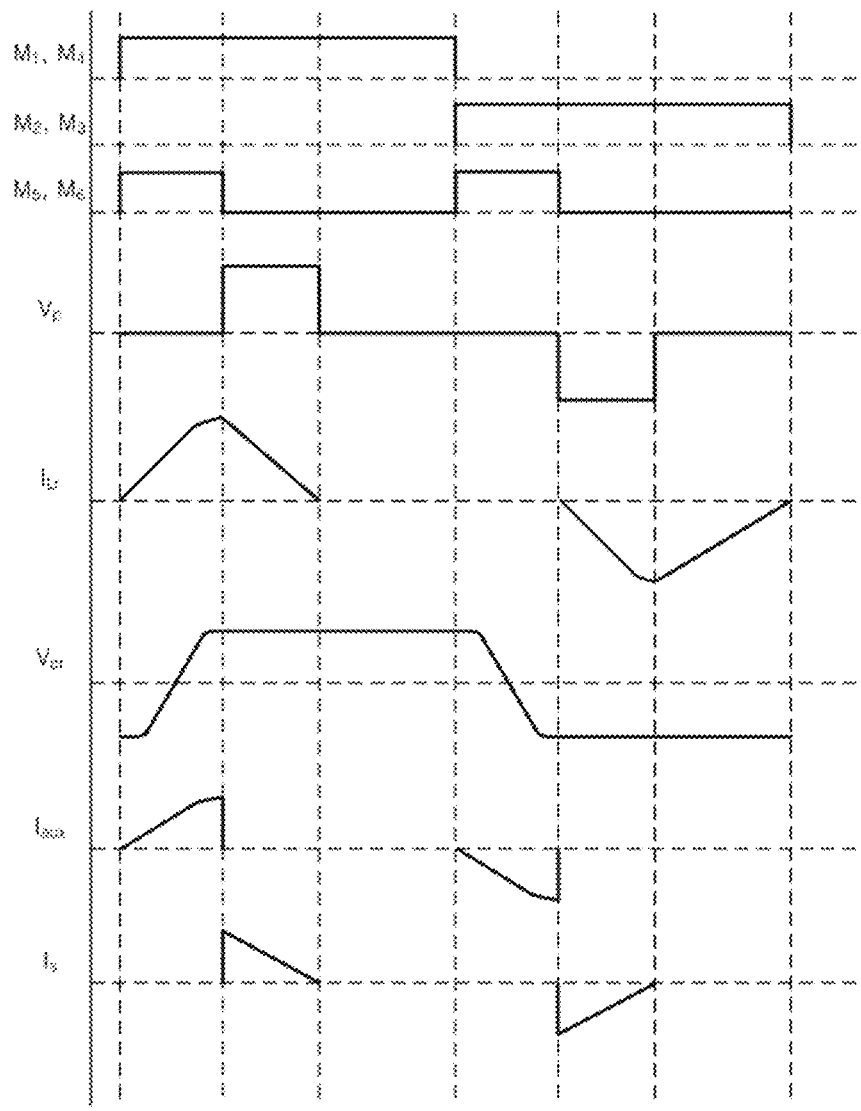
FIG. 8 illustrates the operation of a battery charging device for an electric vehicle in a case where the magnitude of the inputted rectified voltage ($V_{in}$) is smaller than the sum ($=2V_{batt}/n$) of the voltage applied to the primary winding of the first transformer $T_1$ and the voltage applied to the primary winding of the second transformer $T_2$.

FIG. 8 illustrates the operation of an electric vehicle battery charging device 300 in a case where the magnitude of the inputted rectified voltage ($V_{in}$) is smaller than the sum ($=2V_{batt}/n$) of the voltage applied to the primary winding of the first transformer $T_1$ and the voltage applied to the primary winding of the second transformer $T_2$, while FIG. 9A, FIG. 9B, FIG. 10A, and FIG. 10B illustrate the flow of an electric current in an electric vehicle battery charging device 300 that is controlled as in FIG. 8.

Referring to FIG. 8, if the magnitude of the rectified voltage ($V_{in}$) is smaller than the sum of the voltage applied to the primary winding of the first transformer $T_1$ and the voltage applied to the primary winding of the first transformer $T_2$, the switching control part 308 may first switch on the first switching element $M_1$ and fourth switching element $M_4$ and switch off the second switching element $M_2$ and third switching element $M_3$, and at the same time turn on the switching part 306 (i.e. switch on the fifth switching element $M_5$ and sixth switching element $M_6$).

Figure 9A:
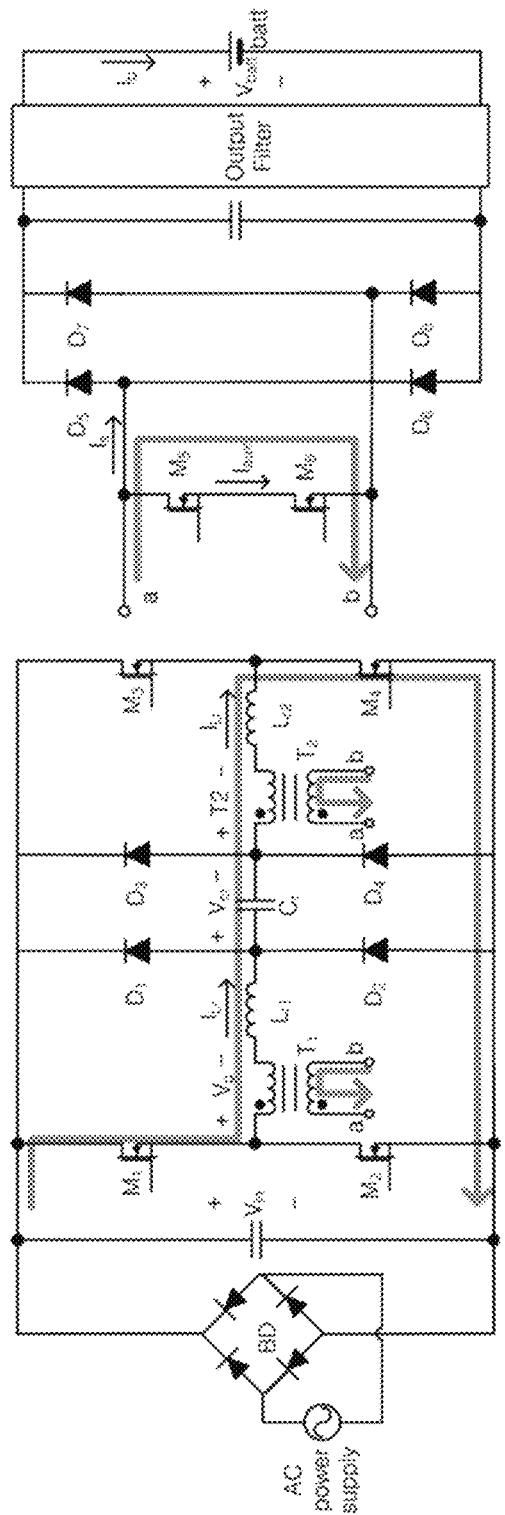
FIG. 9A, FIG. 9B, FIG. 10A, and FIG. 10B illustrate the flow of an electric current in a battery charging device for an electric vehicle that is controlled as in FIG. 8.

Here, the path of the electric current within the electric vehicle battery charging device 300 may be formed as indicated in FIG. 9A. That is, as the switching part 306 is turned on, the secondary winding of the first transformer $T_1$ and the secondary winding of the second transformer $T_2$ may be short-circuited, and as a result, the path of the electric current in the series resonance part 302 may be formed in the same manner as described above with reference to FIG. 6A, so that a resonance current ($I_{Lr}$) may occur in the resonant inductors $L_{r1}$, $L_{r2}$. The resonance current ($I_{Lr}$) thus generated may be transferred to the secondary circuit by way of the secondary windings of the first transformer $T_1$ and second transformer $T_2$, but since it flows through the fifth switching element $M_5$ and sixth switching element $M_6$, it may not be conducted through the fifth to eighth diodes $D_5$-$D_8$, with no electrical power transferred to the output side. During this time, the voltage ($V_{Cr}$) of the resonant capacitor $C_r$ may increase from $-V_{in}$ to $+V_{in}$ while resonating.

Continuing with the description, when the magnitude of the voltage ($V_{Cr}$) of the resonant capacitor $C_r$ becomes equal to the magnitude of the rectified voltage ($V_{in}$), the switching control part 308 may turn off the switching part 306 (i.e. the fifth switching element $M_5$ and sixth switching element $M_6$). In other words, the switching part 306 may be switched on together with the first switching element $M_1$ and fourth switching element $M_4$, and can be switched off at a point when the magnitude of the voltage ($V_{Cr}$) applied to the resonant capacitor $C_r$ becomes equal to the magnitude of the rectified voltage ($V_{in}$) while the first switching element $M_1$ and the fourth switching element $M_4$ are in an on state.

Figure 9B:
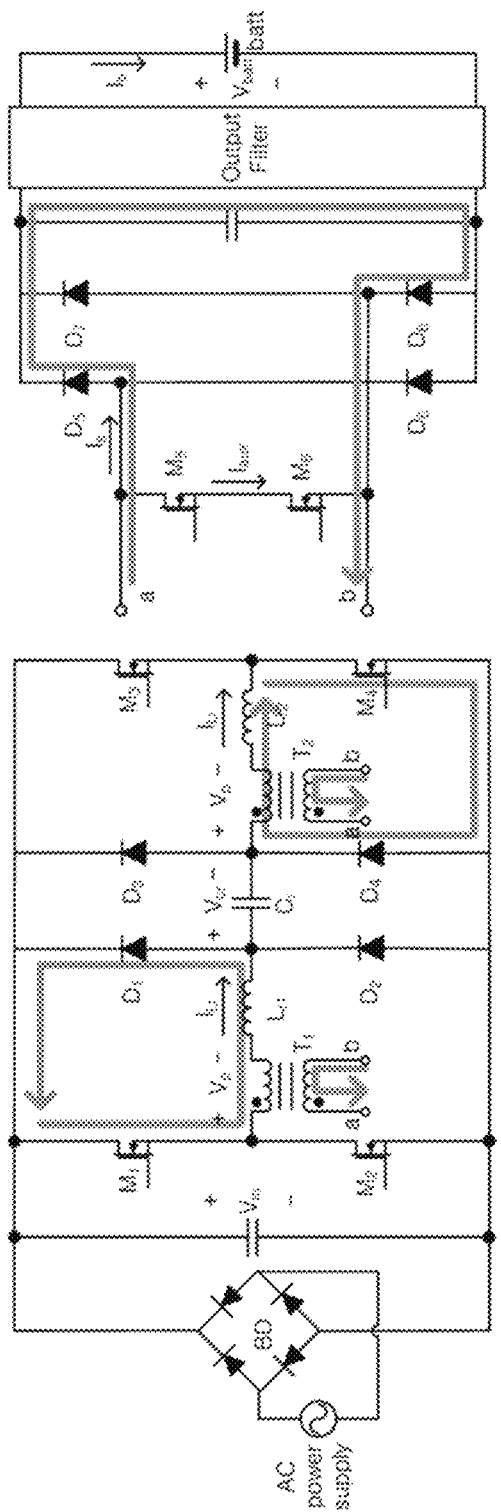

When the magnitude of the voltage ($V_{Cr}$) of the resonant capacitor $C_r$ reaches the magnitude of the input voltage ($V_{in}$) and the switching part 306 is turned off, the resonance current ($I_{Lr}$) may decrease linearly with a slope of $-V_{batt}/(nL)$ while it flows through the first diode $D_1$ and fourth diode $D_4$, as illustrated in FIG. 9B, to be transferred through the first transformer $T_1$, second transformer $T_2$, fifth diode $D_5$, and eighth diode $D_8$ to the output side.

Afterwards, when the magnitude of the resonance current ($I_{Lr}$) becomes 0, there would be no electric current flowing within the electric vehicle battery charging device 300 and the operation of the overall circuit may be halted.

Next, the switching control part 308 may switch off the first switching element $M_1$ and the fourth switching element $M_4$, switch on the second switching element $M_2$ and the third switching element $M_3$, and at the same time, turn on the switching part 306 (i.e. switch on the fifth switching element $M_5$ and sixth switching element $M_6$).

Figure 10A:
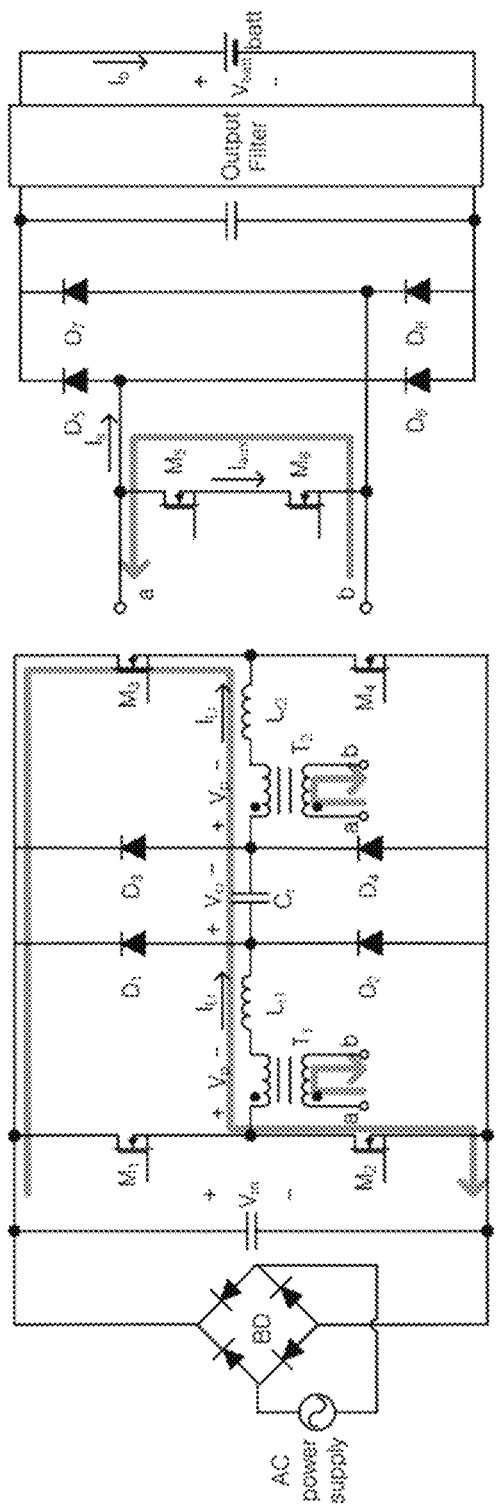

Here, the path of the electric current within the electric vehicle battery charging device 300 may be formed as indicated in FIG. 10A. That is, as the switching part 306 is turned on, the secondary winding of the first transformer $T_1$ and the secondary winding of the second transformer $T_2$ may be short-circuited, and as a result, the path of the electric current in the series resonance part 302 may be formed in the same manner as described above with reference to FIG. 7A, so that a resonance current ($I_{Lr}$) may occur in the resonant inductors $L_{r1}$, $L_{r2}$. The resonance current ($I_{Lr}$) thus generated may be transferred to the secondary circuit by way of the secondary windings of the first transformer $T_1$ and second transformer $T_2$, but since it flows through the fifth switching element $M_5$ and sixth switching element $M_6$, it may not be conducted through the sixth and seventh diodes $D_6$, $D_7$, with no electrical power transferred to the output side. During this time, the voltage ($V_{Cr}$) of the resonant capacitor $C_r$ may decrease from $+V_{in}$ to $-V_{in}$ while resonating.

Continuing with the description, when the magnitude of the voltage ($V_{Cr}$) of the resonant capacitor $C_r$ becomes equal to the magnitude of the rectified voltage ($V_{in}$), the switching control part 308 may turn off the switching part 306 (i.e. the fifth switching element $M_5$ and sixth switching element $M_6$). In other words, the switching part 306 can be turned on together with the second switching element $M_2$ and the third switching element $M_3$, and can be turned off at a point when the magnitude of the voltage ($V_{Cr}$) applied to the resonant capacitor $C_r$ becomes equal to the magnitude of the rectified voltage ($V_{in}$) while the second switching element $M_2$ and the third switching element $M_3$ are in an on state.

Figure 10B:
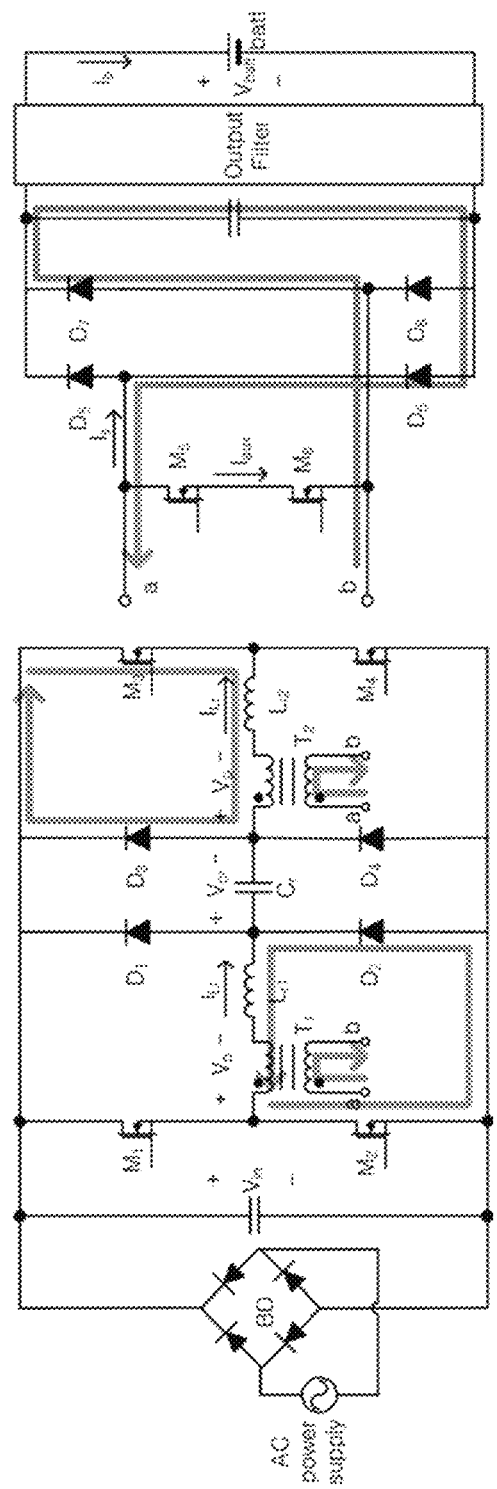

When the magnitude of the voltage ($V_{Cr}$) of the resonant capacitor $C_r$ reaches the magnitude of the input voltage ($V_{in}$) and the switching part 306 is turned off, the resonance current ($I_{Lr}$) may increase linearly with a slope of $V_{batt}/(nL)$ while it flows through the second diode $D_2$ and third diode $D_3$, as illustrated in FIG. 10B, to be transferred through the first transformer $T_1$, second transformer $T_2$, sixth diode $D_6$, and seventh diode $D_7$ to the output side.

Afterwards, when the magnitude of the resonance current ($I_{Lr}$) becomes 0, there would be no electric current flowing within the electric vehicle battery charging device 300 and the operation of the overall circuit may be halted.

In summary, looking at the operating waveform in the segment where the magnitude of the inputted rectified voltage ($V_{in}$) is smaller than $2V_{batt}/n$, the current $I_s$ flowing through the secondary circuit may be transferred to the output side from the point when the switching part 306 is turned off until the point when the resonance current ($I_{Lr}$) becomes 0. As such, the waveform of $I_s$ has a triangular form.

Next, the switching control part 308 may, from a state in which the switching part 306 is off (i.e. the fifth switching element $M_5$ and sixth switching element $M_6$ are off), switch on the second switching element $M_2$ and third switching element $M_3$ simultaneously and switch off the first switching element $M_1$ and fourth switching element $M_4$ simultaneously.

The operation of the electric vehicle battery charging device 300 here can be symmetrical to the mode of operation described above, and as such, will not be described in further detail.

Briefly put, in cases where the magnitude of the rectified voltage ($V_{in}$) is smaller than the sum of the voltage applied to the primary winding of the first transformer $T_1$ and the primary winding of the second transformer $T_2$, the switching control part 308 may provide control such that the first switching element $M_1$ and the fourth switching element $M_4$ are turned on/off simultaneously, the second switching element $M_2$ and the third switching element $M_3$ are turned on/off simultaneously, and the time during which the first switching element $M_1$/fourth switching element $M_4$ are turned on does not overlap the time during which the second switching element $M_2$/third switching element $M_3$ are turned on, with the switching part 305 also turned on at the point when the first to fourth switching elements $M_1$, $M_2$, $M_3$, $M_4$ are turned on, and with the switching part 305 turned off at the point when the magnitude of the voltage ($V_{Cr}$) applied to the resonant capacitor $C_r$ becomes equal to the rectified voltage ($V_{in}$) while the first to fourth switching elements $M_1$, $M_2$, $M_3$, $M_4$ are in an on state, and as a result of the above, the battery for an electric vehicle (batt) may be charged. Here, the first to fourth switching elements $M_1$, $M_2$, $M_3$, $M_4$ can be switched on or off periodically, and the period of switching on/off for the first to fourth switching elements $M_1$, $M_2$, $M_3$, $M_4$ can be the same.

Although the descriptions above refer to controlling the on/off state of the switching part 306 only when the magnitude of the rectified voltage ($V_{in}$) is smaller than the sum of the sum of the voltage applied to the primary winding of the first transformer $T_1$ and the voltage applied to the primary winding of the first transformer $T_2$, another embodiment of the invention can entail controlling the on/off state of the switching part 306 even when the magnitude of the rectified voltage ($V_{in}$) is greater than or equal to the sum of the sum of the voltage applied to the primary winding of the first transformer $T_1$ and the voltage applied to the primary winding of the first transformer $T_2$. In such a case, the switching control part 308 can control the series resonance part 302 and the switching part 306 by using the same control signals regardless of the magnitude of the rectified voltage ($V_{in}$), thereby enabling a more simplified control.

FIG. 11 through FIG. 18 show simulation results for the operation of an electric vehicle battery charging device 300 according to the first disclosed embodiment of the invention. A description of the simulation results is provided below with reference to FIG. 11 through FIG. 18.

Figure 11:
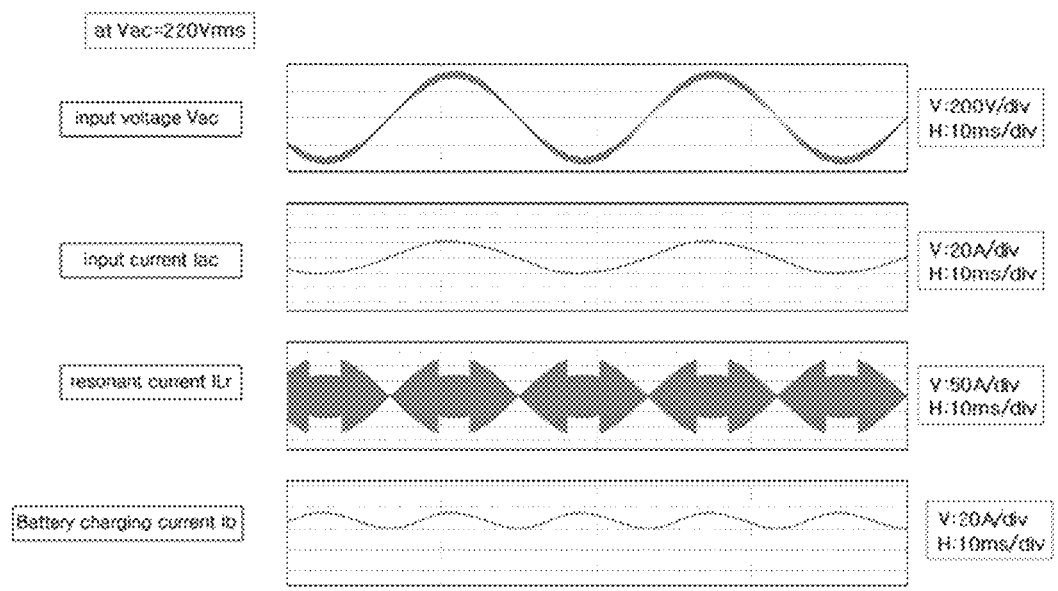
FIG. 11, FIG. 12, FIG. 13, FIG. 14, FIG. 15, FIG. 16, FIG. 17, and FIG. 18 show simulation results for the operation of a battery charging device for an electric vehicle according to the first disclosed embodiment of the invention.
Figure 12:
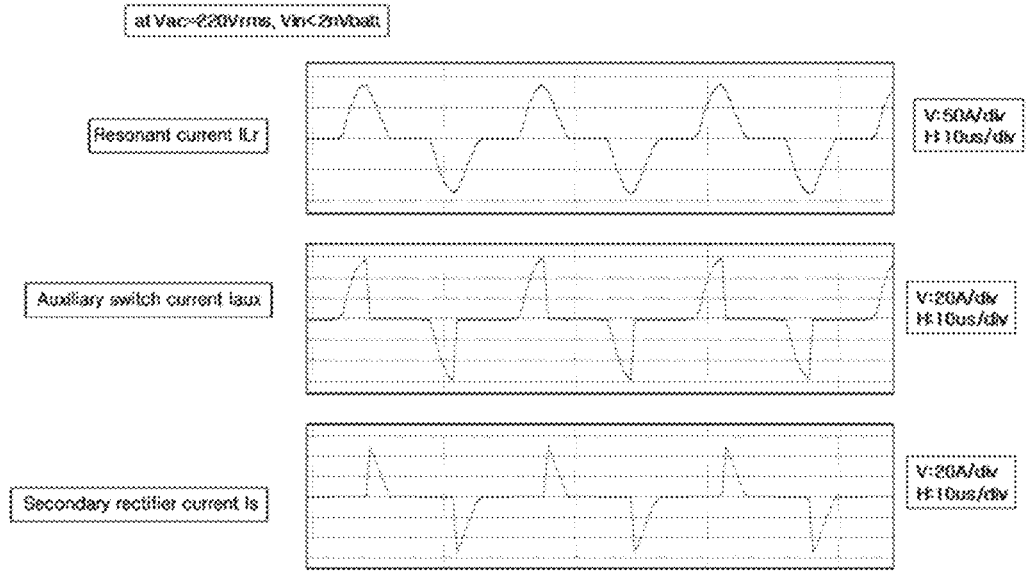
Figure 13:
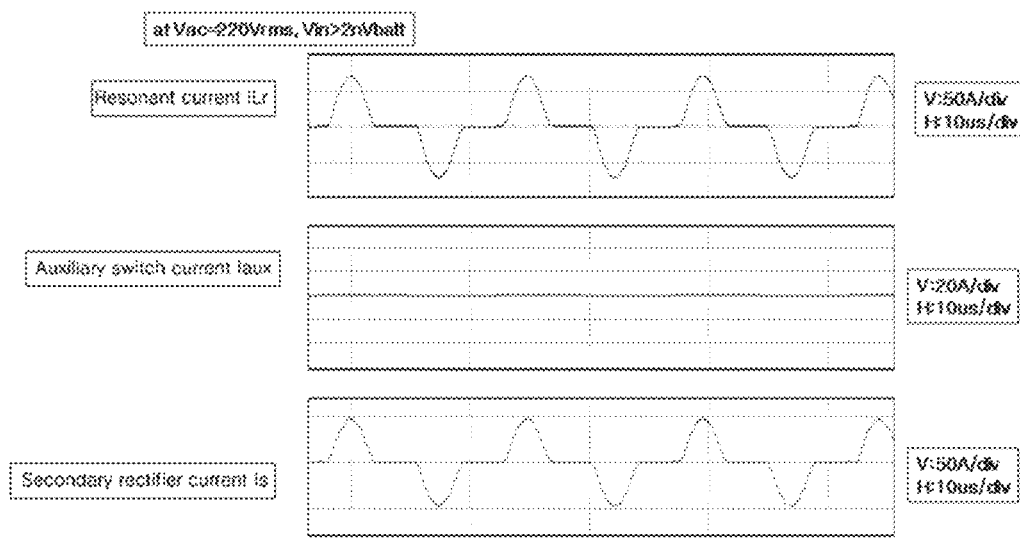

First, FIG. 11 to FIG. 13 present graphs that show simulation results obtained when the switching is controlled as in the upper part of FIG. 5, with the Vrms of the rectified voltage ($V_{in}$)(=input voltage ($V_{ac}$)) set to 220 Vrms.

Referring to FIG. 11 to FIG. 13, it can be observed that the input current ($I_{in}=I_{ac}$) soundly follows the waveform of the input voltage ($V_{ac}$) and that a high power factor is obtained. Also, a change in the form of the resonance current ($I_{Lr}$) can be observed, as the switching part 306 (i.e. fifth switching element $M_5$ and sixth switching element $M_6$) is operated differently according to the input voltage ($V_{ac}$), as illustrated in FIG. 12 and FIG. 13.

Figure 14:
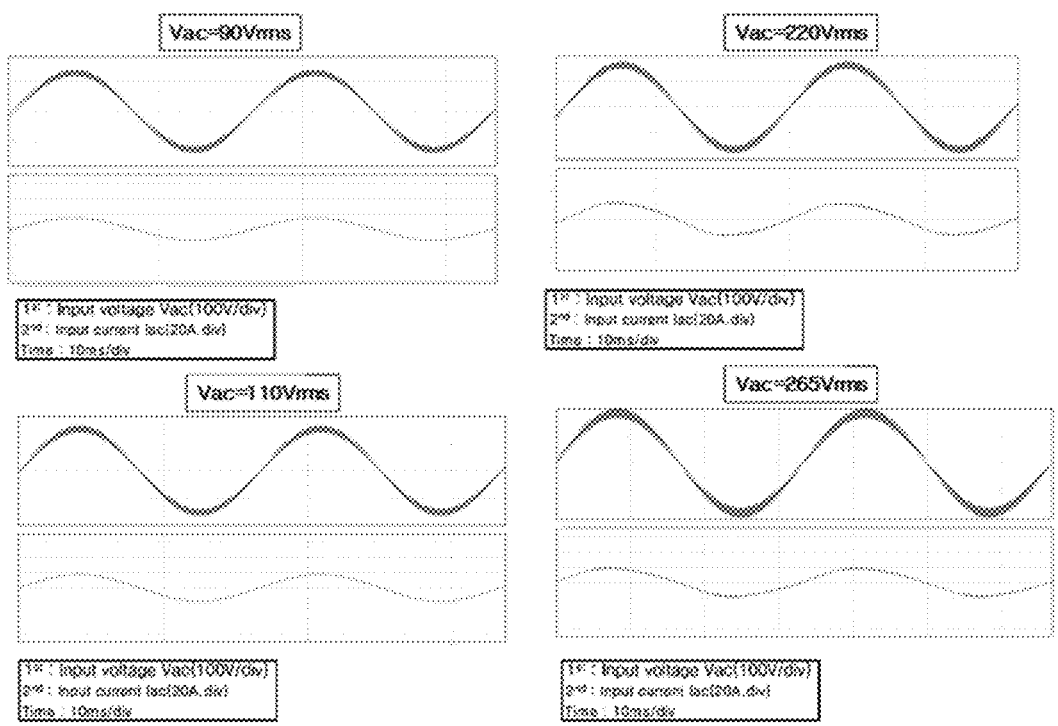

Also, FIG. 14 presents graphs that show simulation results for the input current ($I_{ac}$) according to the input voltage ($V_{ac}$), where it can be observed that a high power factor is ensured over a broad range of input.

Figure 15:
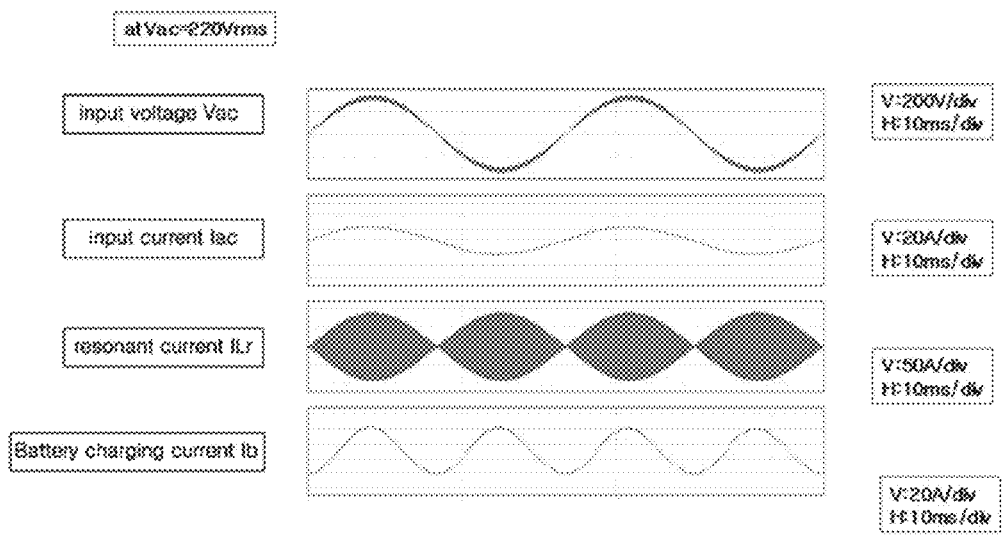
Figure 16:
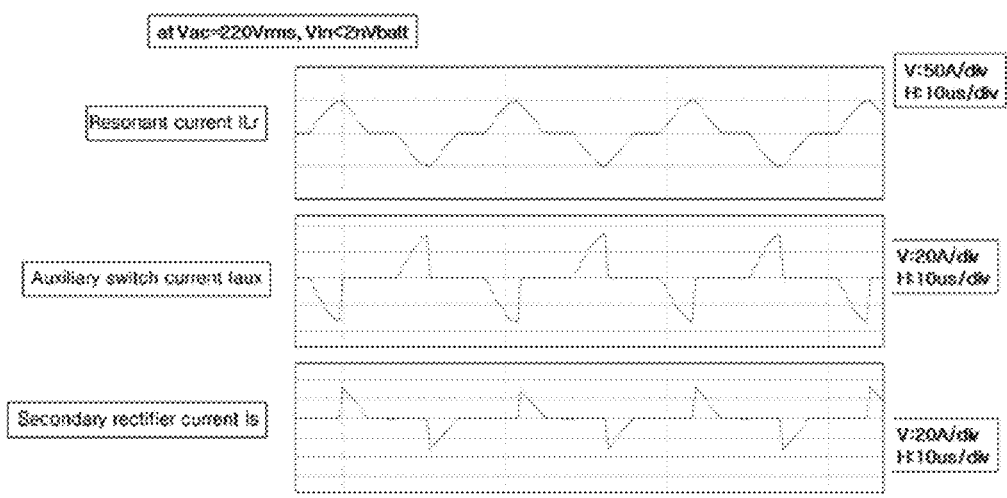
Figure 17:
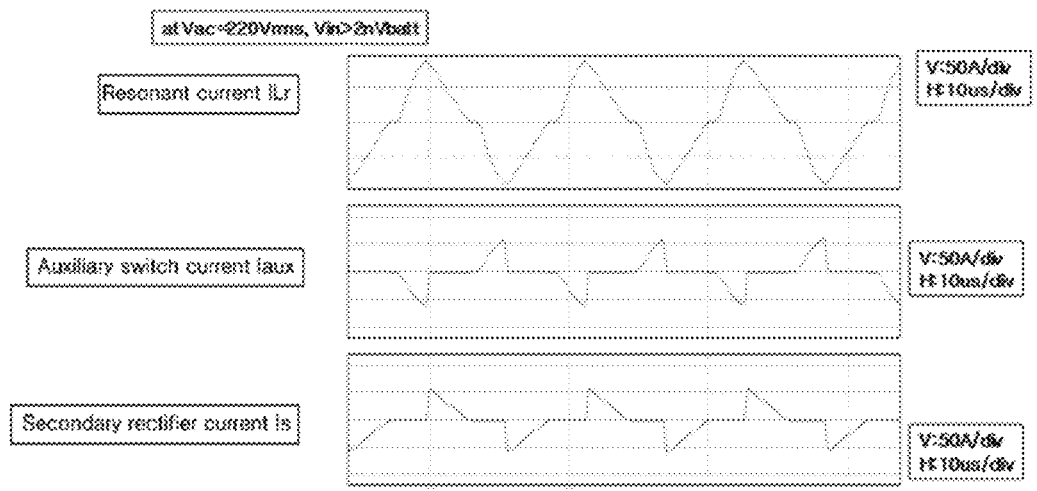

Next, FIG. 15 to FIG. 17 present graphs that show simulation results obtained when the switching is controlled as in the upper part of FIG. 8, with the Vrms of the rectified voltage ($V_{in}$)(=input voltage ($V_{ac}$)) set to 220 Vrms.

Referring to FIG. 15 to FIG. 17, it can be observed that there are no segments in which the waveform of the resonance current ($I_{Lr}$) in FIG. 15 is changed, as the switching part 306 is always operated regardless of the input voltage ($V_{ac}$).

Figure 18:
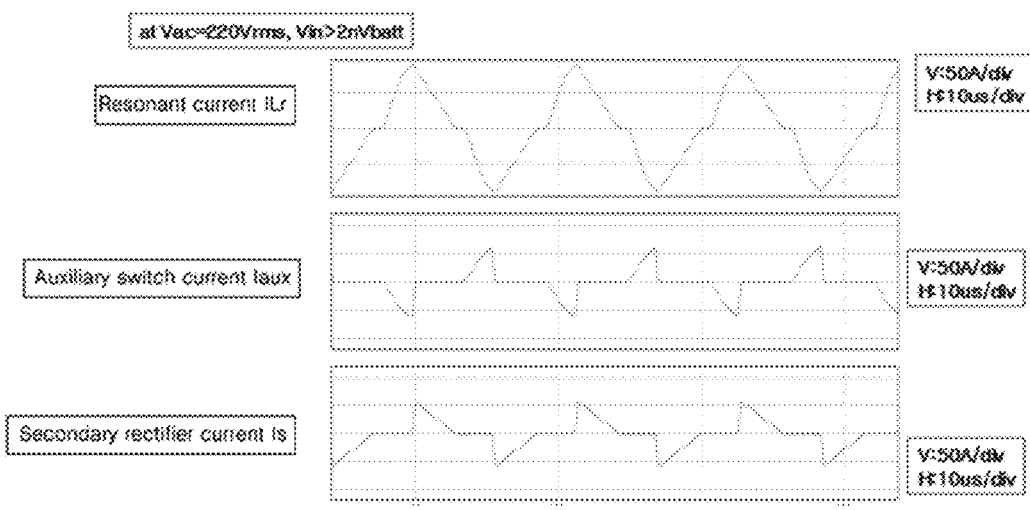

Also, FIG. 18 presents graphs that show simulation results for the input current ($I_{ac}$) according to the input voltage ($V_{ac}$), where it can be observed that a charging operation can be implemented while a high power factor is ensured over a broad range of input.

Figure 19:
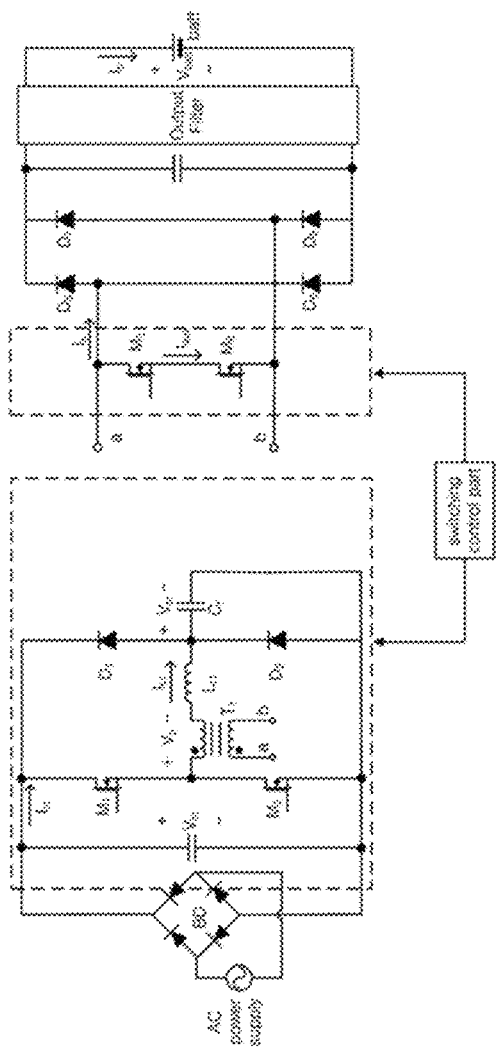
FIG. 19 illustrates the detailed composition of a battery charging device for an electric vehicle according to a second disclosed embodiment of the invention.

FIG. 19 illustrates the detailed composition of a battery charging device for an electric vehicle according to a second disclosed embodiment of the invention.

Referring to FIG. 19, an electric vehicle battery charging device 1900 may be substantially the same as the electric vehicle battery charging device 300 described above with reference to FIG. 3, with the exception that, in the series resonance part 1902, the third switching element, the fourth switching element, the third diode, the fourth diode, the second transformer, and the second resonant inductor are removed, and the other end of the resonant capacitor is connected with a ground.

Table 1 shown below lists the corresponding relationships between components of the electric vehicle battery charging device 300 illustrated in FIG. 3 and components of the electric vehicle battery charging device 1900 illustrated in FIG. 19. The features described with reference to FIG. 3 can be applied in the same manner, based on Table 1, to an electric vehicle battery charging device 1900 according to the second disclosed embodiment of the invention.

TABLE 1

| First Disclosed Embodiment (FIG. 3) | Second Disclosed Embodiment (FIG. 11) |
| --- | --- |
| first switching element $M_1$ and fourth switching element $M_4$ | first switching element $M_1$ |
| second switching element $M_2$ and third switching element $M_3$ | second switching element $M_2$ |
| first diode $D_1$ and fourth diode $D_4$ | first diode $D_1$ |
| second diode $D_2$ and third diode $D_3$ | second diode $D_2$ |
| first resonant inductor $L_{r1}$ and second resonant inductor $L_{r2}$ | resonant inductor $L_r$ |
| first transformer $T_1$ and second transformer $T_2$ | transformer T |
| comparison made between magnitude of rectified voltage ($V_{in}$) and $2V_{batt}/n$ | comparison made between magnitude of rectified voltage ($V_{in}$) and $V_{batt}/n$ |

Thus, further descriptions on the electrical vehicle battery charging device 1100 according to the second disclosed embodiment of the invention are omitted.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A battery charging device for an electric vehicle, the battery charging device comprising:

a series resonance part having a first switching element, a second switching element having one end thereof connected with the other end of the first switching element, a transformer having one end of a primary winding thereof connected with the other end of the first switching element and one end of the second switching element, a resonant inductor having one end thereof connected with the other end of the primary winding of the transformer, a first diode having one end thereof connected with one end of the first switching element and the other end thereof connected with the other end of the resonant inductor, a second diode having one end thereof connected with the other end of the resonant inductor and the other end thereof connected with the other end of the second switching element, a resonant capacitor having one end thereof connected with the other end of the resonant inductor and the other end thereof connected with the other end of the second diode, the series resonance part configured to receive a rectified voltage as input through the one end of the first switching element and the other end of the second switching element;

a rectifying part having a first input end thereof connected with one end of a secondary winding of the transformer, a second input end thereof connected with the other end of the secondary winding of the transformer, and an output end thereof connected with an electric vehicle battery; and a switching part having one end thereof connected with one end of the secondary winding of the transformer and with the first input end of the rectifying part and having the other end thereof connected with the other end of the secondary winding of the transformer and with the second input end of the rectifying part, the switching part configured to switch to an on state or an off state for controlling a flow of an electric current from the secondary winding of the transformer to the rectifying part.

2. The battery charging device of claim 1, wherein a time during which the first switching element is in an on state does not overlap a time during which the second switching element is in an on state.

3. The battery charging device of claim 2, wherein the first switching element and the second switching element are switched on or off periodically, and a period of switching on or off for the first switching element and a period of switching on or off for the second switching element are equal.

4. The battery charging device of claim 2, wherein the switching part is switched on together with the first switching element and the second switching element, and is switched off at a point when a magnitude of a voltage applied to the resonant capacitor becomes equal to a magnitude of the inputted rectified voltage while the first switching element and the second switching element are in an on state.

5. The battery charging device of claim 4, wherein the switching part is switched on together with the first switching element and the second switching element while a magnitude of the inputted rectified voltage is greater than or equal to a voltage applied to the primary winding of the transformer, and is switched off at a point when a magnitude of a voltage applied to the resonant capacitor becomes equal to a magnitude of the inputted rectified voltage while the first switching element and the second switching element are in an on state.

6. The battery charging device of claim 1, wherein the resonant capacitor is a film capacitor.

7. The battery charging device of claim 1, wherein the rectifying part comprises four diodes connected in a full bridge configuration.

8. A battery charging device for an electric vehicle, the battery charging device comprising:

a series resonance part configured to receive a rectified voltage as input, the series resonance part comprising a first transformer, a first resonant inductor having one end thereof connected with the other end of the primary winding of the first transformer, a resonant capacitor having one end thereof connected with the other end of the first resonant inductor, a second transformer having one end of the primary winding thereof connected with the other end of the resonant capacitor, and a second resonant inductor having one end thereof connected with the other end of the primary winding of the second transformer;

a rectifying part having a first input end thereof connected with one end of a secondary winding of the first transformer and with one end of a secondary winding of the second transformer, a second input end thereof connected with the other end of the secondary winding of the first transformer and with the other end of the secondary winding of the second transformer, and an output end thereof connected with an electric vehicle battery; and a switching part having one end thereof connected with one end of the secondary winding of the first transformer, one end of the secondary winding of the second transformer, and the first input end of the rectifying part and having the other end thereof connected with the other end of the secondary winding of the first transformer, the other end of the secondary winding of the second transformer, and the second input end of the rectifying part, the switching part configured to switch to an on state or an off state for controlling a flow of an electric current from the secondary winding of the first transformer and the secondary winding of the first transformer to the rectifying part.

9. The battery charging device of claim 8, wherein the series resonance part further comprises:

a first switching element having the other end thereof connected with one end of the primary winding of the first transformer; a second switching element having one end thereof connected with one end of the primary winding of the first transformer; a third switching element having the other end thereof connected with one end of the primary winding of the second transformer; a fourth switching element having one end thereof connected with one end of the primary winding of the second transformer; a first diode having one end thereof connected with one end of the first switching element and having the other end thereof connected with other end of the primary winding of the first transformer; a second diode having one end thereof connected with the other end of the primary winding of the first transformer and having the other end thereof connected with the other end of the second switching element; a third diode having one end thereof connected with one end of the third switching element and having the other end thereof connected with the one end of the primary winding of the second transformer; and a fourth diode having one end thereof connected with one end of the primary winding of the second transformer and having the other end thereof connected with the other end of the fourth switching element.

10. The battery charging device of claim 9, wherein the rectified voltage is inputted through one end of the first switching element and the other end of the second switching element, and the other end of the first diode and one end of the second diode are connected by way of the first resonant inductor with the other end of the primary winding of the first transformer.

11. The battery charging device of claim 10, wherein the other end of the third diode and one end of the fourth diode are connected by way of the second resonant inductor with the other end of the primary winding of the second transformer, the one end of the resonant capacitor is connected with the other end of the first diode and one end of the second diode, and the other end of the resonant capacitor is connected with the other end of the third diode and one end of the fourth diode.

12. The battery charging device of claim 11, wherein the first switching element and the fourth switching element are switched on or off simultaneously, the second switching element and the third switching element are switched on or off simultaneously, and a time during which the first switching element and the fourth switching element are in an on state does not overlap a time during which the second switching element and the third switching element are in an on state.

13. The battery charging device of claim 12, wherein the first switching element, the second switching element, the third switching element, and the fourth switching element are switched on or off periodically, and a period of switching on or off for the first switching element, a period of switching on or off for the second switching element, a period of switching on or off for the third switching element, and a period of switching on or off for the fourth switching element are equal.

14. The battery charging device of claim 12, wherein the switching part is switched on together with the first switching element, the second switching element, the third switching element, and the fourth switching element, and is switched off at a point when a magnitude of a voltage applied to the resonant capacitor becomes equal to a magnitude of the inputted rectified voltage while the first switching element, the second switching element, the third switching element, and the fourth switching element are in an on state.

15. The battery charging device of claim 14, wherein the switching part is switched on together with the first switching element and the second switching element while a magnitude of the inputted rectified voltage is greater than or equal to a sum of a voltage applied to the primary winding of the first transformer and a voltage applied to the primary winding of the second transformer, and is switched off at a point when a magnitude of a voltage applied to the resonant capacitor becomes equal to a magnitude of the inputted rectified voltage while the first switching element and the second switching element are in an on state.

16. The battery charging device of claim 8, wherein the resonant capacitor is a film capacitor.

17. The battery charging device of claim 8, wherein the rectifying part comprises four diodes connected in a full bridge configuration.

* * * * *